United States Patent
Bharat et al.

(10) Patent No.: US 10,389,723 B1
(45) Date of Patent: *Aug. 20, 2019

(54) SYSTEMS AND METHODS FOR MONETIZING SUBSCRIPTION AND ARCHIVAL NEWS CONTENT

(71) Applicant: Google LLC, Mountain View, CA (US)

(72) Inventors: Krishna Bharat, Santa Clara, CA (US); Michael Schmitt, Mountain View, CA (US); Michael Curtiss, Sunnyvale, CA (US); Marissa Mayer, Palo Alto, CA (US); Kerah Cottrell, Mountain View, CA (US); Hong Zhou, Sunnyvale, CA (US); Duane Scott Hess, Cupertino, CA (US)

(73) Assignee: Google LLC, Mountain View, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/973,213

(22) Filed: Dec. 17, 2015

Related U.S. Application Data

(63) Continuation of application No. 10/748,662, filed on Dec. 31, 2003, now Pat. No. 9,251,519.

(51) Int. Cl.
| | |
|---|---|
| *G06Q 10/10* | (2012.01) |
| *G06Q 30/02* | (2012.01) |
| *G06Q 10/06* | (2012.01) |
| *G06Q 30/06* | (2012.01) |
| *H04L 29/06* | (2006.01) |
| *G06Q 20/14* | (2012.01) |
| *G06F 16/2457* | (2019.01) |

(52) U.S. Cl.
CPC ...... *H04L 63/102* (2013.01); *G06F 16/24575* (2019.01); *G06Q 20/145* (2013.01); *G06Q 30/02* (2013.01); *H04L 63/108* (2013.01)

(58) Field of Classification Search
CPC .... G06Q 30/02; G06Q 20/145; H04L 63/102; H04L 63/108; G06F 16/24575
USPC .......................... 705/1.1–912; 707/706, 770
See application file for complete search history.

(56) References Cited

U.S. PATENT DOCUMENTS

| | | | |
|---|---|---|---|
| 5,930,777 | A | 7/1999 | Barber |
| 5,940,843 | A | 8/1999 | Zucknovich et al. |
| 6,038,597 | A | 3/2000 | Van Wyngarden |
| 6,671,684 | B1 * | 12/2003 | Hull ................. G06F 17/30011 |

(Continued)

OTHER PUBLICATIONS

"Associated Press and Yahoo Introduce AP Archives on Yahoo News," Business Wire, Dec. 12, 2002. (Year: 2002).*

(Continued)

*Primary Examiner* — Jonathan P Ouellette
(74) *Attorney, Agent, or Firm* — Fish & Richardson P.C.

(57) ABSTRACT

A news aggregation server aggregates and monetizes restricted news content. The news aggregation server fetches the restricted news content from multiple news source servers that are remote from the news aggregation server. The news aggregation server aggregates the fetched restricted news content and searches the aggregated news content based on input received from a client. The news aggregation server provides access to selected news content from the aggregated news content that is relevant to the client input and charges the user a price for accessing the selected restricted news content.

19 Claims, 9 Drawing Sheets

(56) References Cited

U.S. PATENT DOCUMENTS

| | | | |
|---|---|---|---|
| 6,785,671 B1 * | 8/2004 | Bailey | G06F 17/30864 |
| | | | 705/26.81 |
| 6,968,385 B1 | 11/2005 | Gillbert | |
| 6,987,987 B1 | 1/2006 | Vacanti et al. | |
| 7,200,863 B2 | 4/2007 | Shuster | |
| 2004/0139400 A1 * | 7/2004 | Allam | G06F 17/212 |
| | | | 715/201 |

OTHER PUBLICATIONS

"Price Skimming," Dec. 19, 2002, 2 pages, http://Investopedia.com.

* cited by examiner

SYSTEMS AND METHODS FOR MONETIZING SUBSCRIPTION AND ARCHIVAL NEWS CONTENT

CROSS REFERENCE TO RELATED APPLICATIONS

This application is a continuation of and claims priority to U.S. application Ser. No. 10/748,662, entitled "Systems and Methods for Monetizing Subscription and Archival News Content," filed Dec. 31, 2003, which is incorporated by reference in its entirety.

BACKGROUND

Field of the Invention

The present invention relates generally to information aggregation systems and, more particularly, to systems and methods for monetizing aggregated news content including subscription and archival news material

Description of Related Art

Existing news aggregation services (e.g., Google News) search out, and aggregate, news content published on web pages throughout the Internet. In response to a search query from a user, or when a user browses a newspaper section of the news aggregation service, the news aggregation service presents a list of stories, from the aggregated news content, relevant to the query or to the newspaper section requested, with each story involving a group of articles from different publications dealing with the same topic. For the most part, however, news aggregation services aggregate news content from non-subscription publications that do not have restricted access to their news content.

Accordingly, it would be desirable to permit users to access restricted access news content via a web site that hosts a news appregation service.

SUMMARY OF THE INVENTION

Systems and methods, consistent with the principles of the invention, permit users to access restricted access news content via a news aggregation service that fetches and aggregates news content from news source websites across the Internet. A server associated with the news aggregation service may accumulate local copies of restricted access news content hosted on sites throughout the Internet and provide this news content to users with which it has established a billing, or other, relationship (e.g., registration). Users using the news aggregation service may, thus, access restricted access news content in addition to the unrestricted news access content typically available via the news aggregation service.

According to one aspect consistent with the principles of the invention, method of aggregating and monetizing restricted news content at a news aggregation server is provided. The method includes fetching the restricted news content from multiple news source servers that are remote from the news aggregation server and aggregating the restricted news content at the news aggregation server. The method also includes searching the aggregated restricted news content based on input received from a client and providing access, based on a permission protocol, to selected restricted news content from the aggregated news content that is relevant to the client input.

According to another aspect, a method of providing access to restricted news content via a news aggregation service is provided. The method includes providing access to multiple news source sites from an external server implementing the news aggregation service and facilitating retrieval of restricted and unrestricted news content from the multiple news source sites. The method further includes indexing and grouping the retrieved restricted and unrestricted news content and receiving first user input data related to a desired news item. The method also includes searching the indexed and grouped restricted and unrestricted news content to retrieve a list of news stories relevant to the desired news item and receiving second user input data selecting a news story from the list of news stories. The method additionally includes sending the news story to the user in exchange for receiving payment or other consideration from the user.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention permit access, via a news aggregation service that fetches and aggregates restricted, as well as unrestricted, news content from news source web sites across the Internet, to various news content. A server associated with the news aggregation service may provide the restricted news content to users with whom it has established (or will establish) a billing, or other collection, relationship which could be based on monetary payment, user registration information, a combination thereof, or other consideration desired by provides of restricted news content, the news aggregation service, or both.

A "document," as the term is used herein is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "restricted" (or "fee") document is a document for which an entity hosting the document restricts access to the document. Such restricted access may require, for example, payment by a user to access the document. An "unrestricted" (or "free") document is a document for which an entity hosting the document does not restrict access to the document and, thus, it is freely available (i.e., does not require payment for a user to access).

Exemplary Network Configuration

Figure 1:
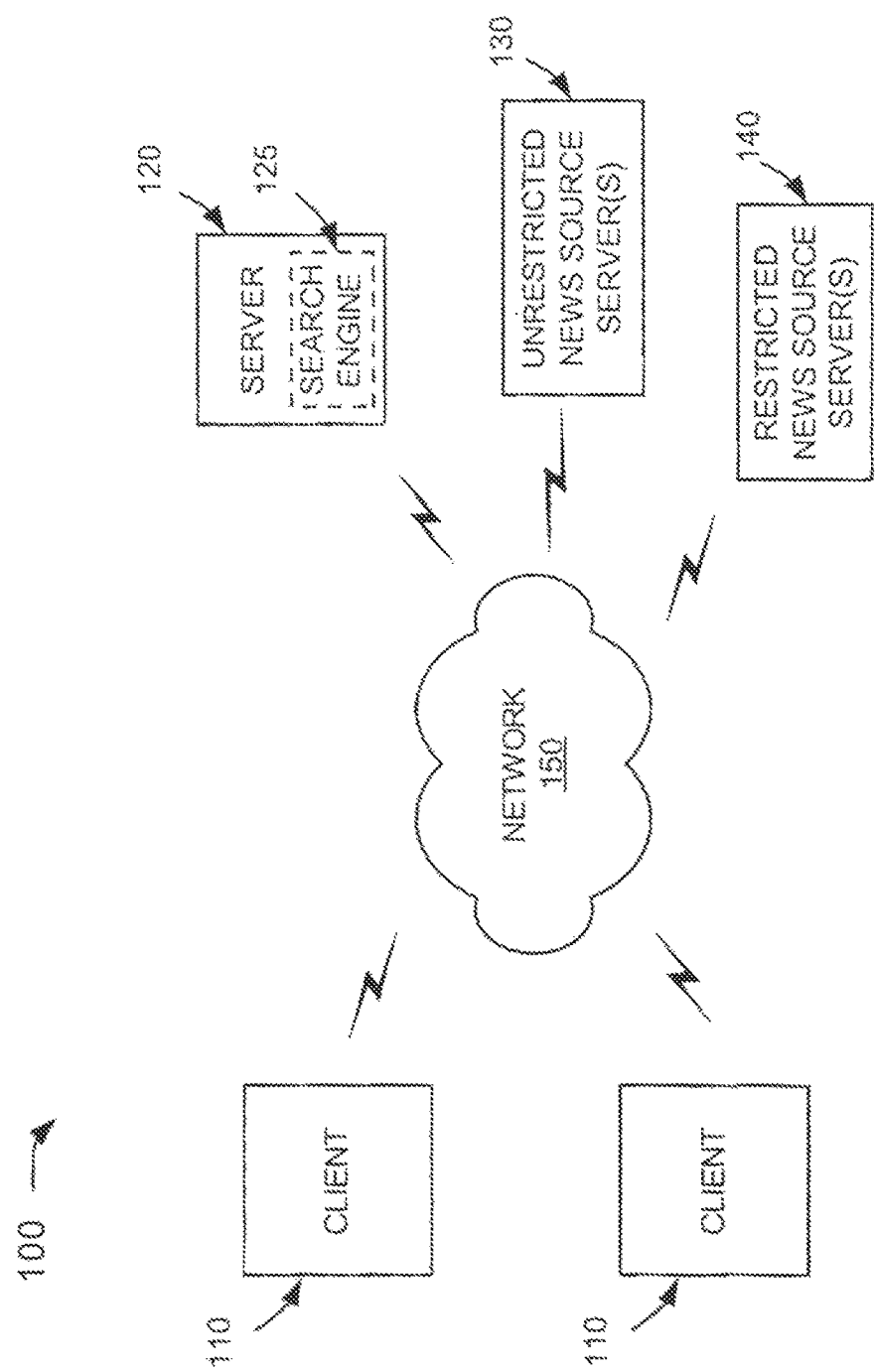
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may be remote from servers 130 and 140 and may include a search engine 125 usable by clients 110. Server 120 may crawl a corpus of news content documents (e.g., web pages) hosted on servers 130 and 140 and store information associated with these news content documents in a repository of crawled documents. Servers 130 and 140 may store or maintain news content documents that may be crawled by server 120. Unrestricted news source server(s) 130 may host documents that contain unrestricted news stories. Restricted news source server(s) 140 may host documents that contain restricted access news stories (e.g., news content that requires user registration and a fee). Such news stories may include recently published news stories, or older (i.e., not recent), archived news stories. A client, or another server, may, thus, become a subscriber to access the restricted news stories hosted on server 140.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Exemplary Client/Server Architecture

Figure 2:
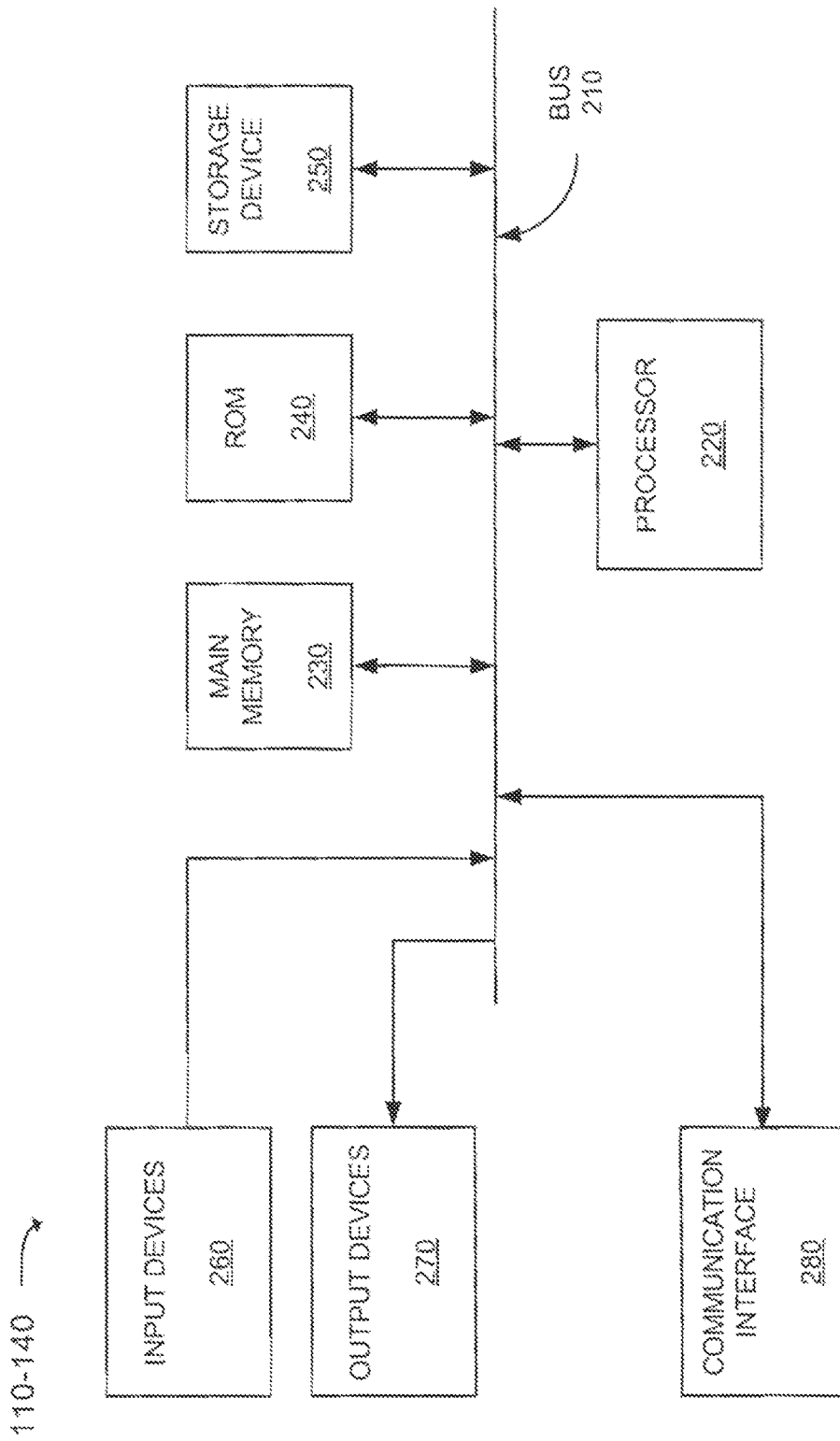
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more types of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, perform certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3A:
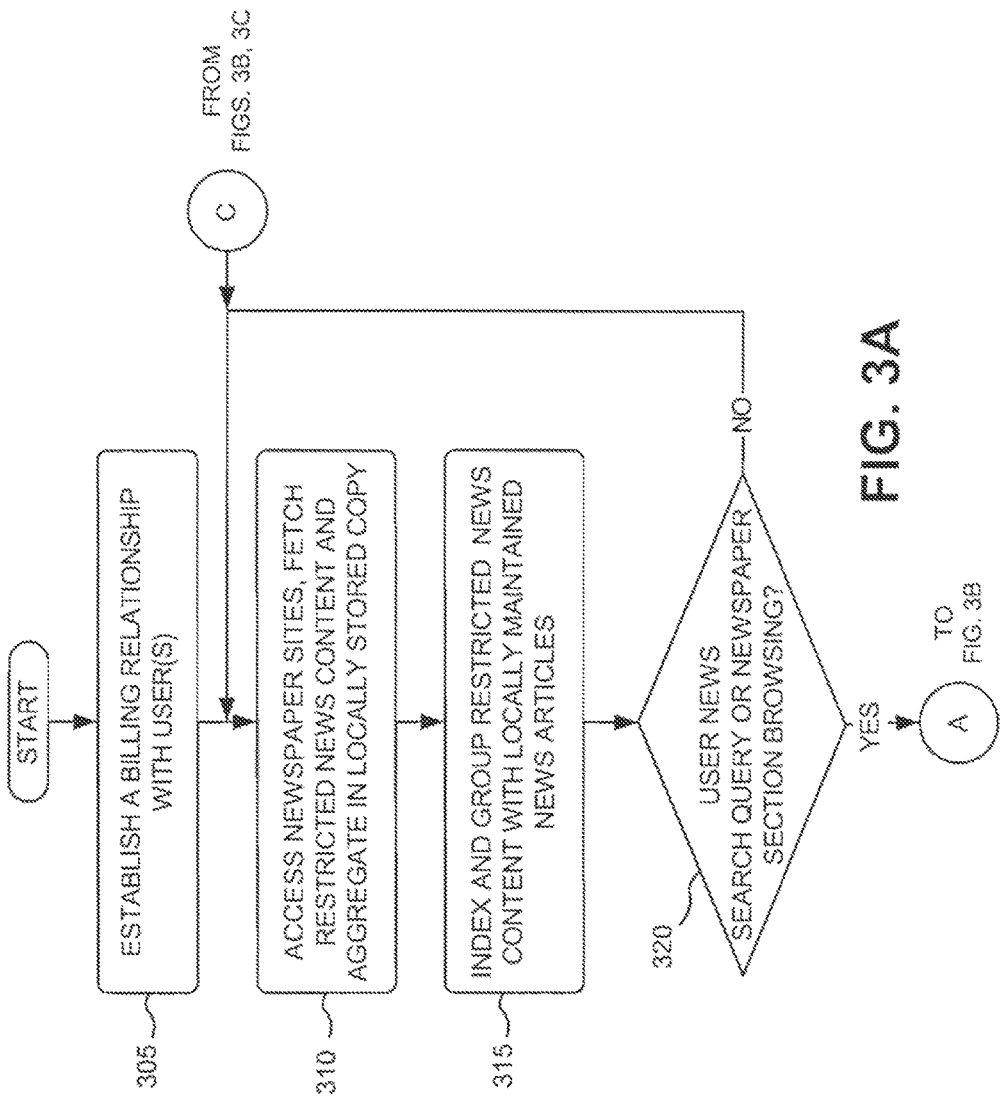
FIGS. 3A, 3B and 3C are flowcharts of exemplary processing for accessing restricted news content via a news aggregation service according to an implementation consistent with the principles of the invention.
Figure 3B:
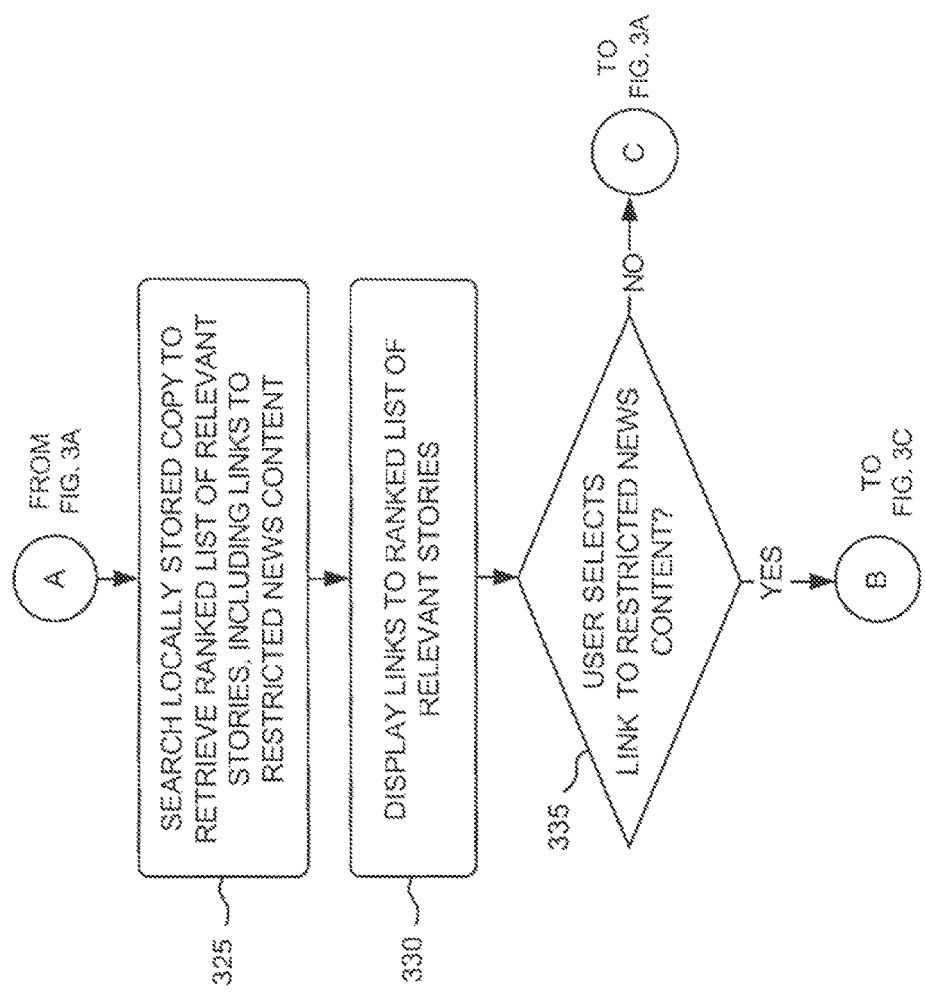
Figure 3C:
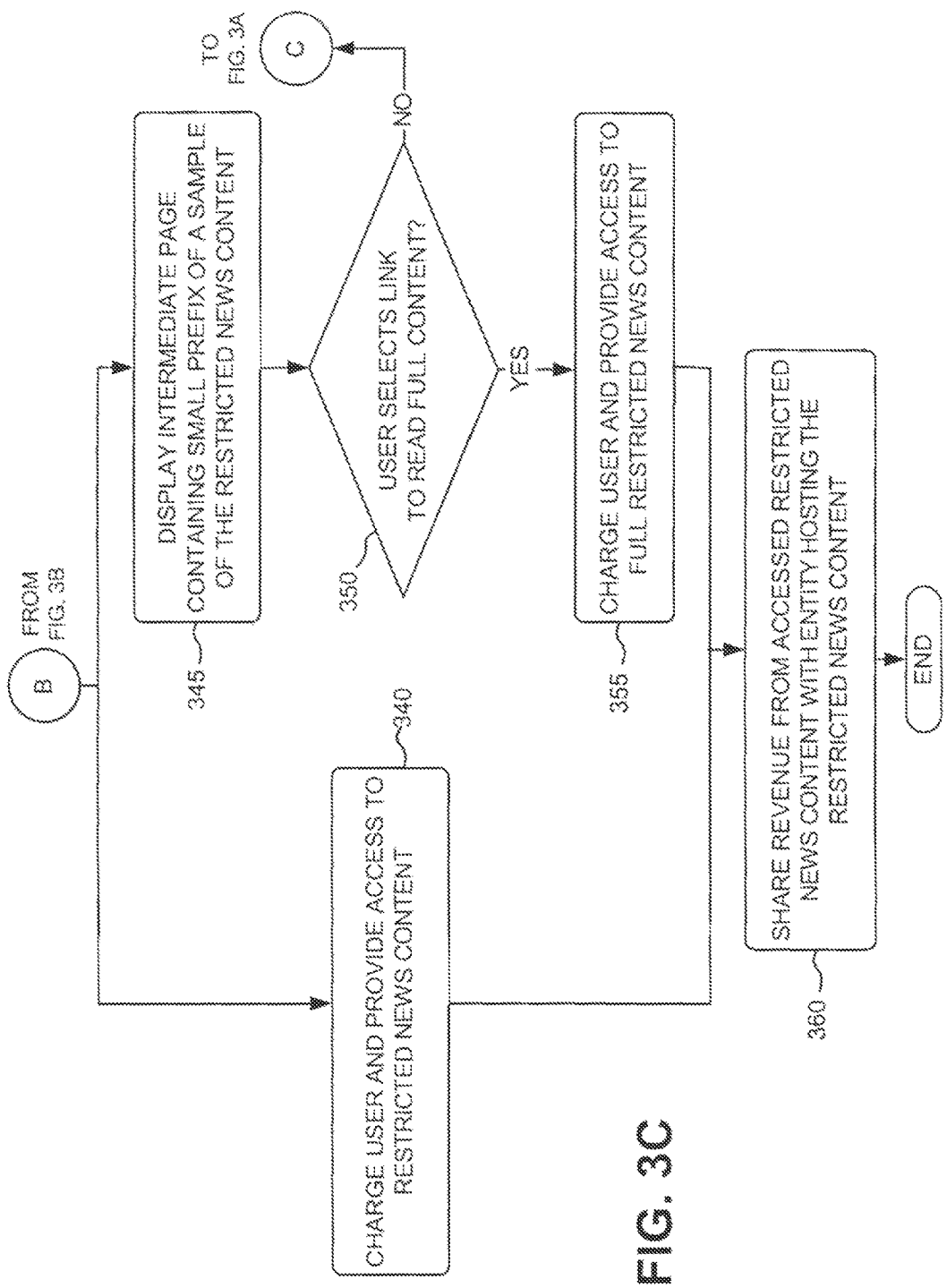

FIGS. 3A, 3B and 3C are flowcharts of exemplary processing for accessing news content via a news aggregation service at a server 120 according to an implementation consistent with the principles of the invention. As one skilled in the art will appreciate, the processing exemplified by FIGS. 3A, 3B and 3C can be implemented in software and stored on a computer-readable memory, such as main memory 230, ROM 240 or storage device 250 of server 120. Alternatively, the processing exemplified by FIGS. 3A, 3B and 3C can be implemented in hardwired circuitry, such as combinational logic, within server 120.

Processing may begin with server 120 optionally establishing a billing relationship with a user who desires to access restricted (e.g., "fee") news content via server 120's news aggregation service (act 305) (FIG. 3A). A user(s) may, for example, access a home page of the news aggregation service (e.g., Google news) and establish an account by entering payment information authorizing server 120 to charge the user for accessing restricted news content via server 120's news aggregation service. In one implementation consistent with the principles of the invention, a user may subscribe to the aggregation news service and prepay for full access to a certain group of publications (e.g., for $10/month the subscriber can get full access to subscription articles from, for example, Time, Newsweek and Scientific American). Optionally, the user may be restricted in the number of such articles that may be read in a specific time period (e.g., 50 articles a month for $3 from a set of news sources). In another implementation consistent with the principles of the invention, the user may stipulate how many subscription sources that require payment can be present in a single story, or on a newspaper page. The user may also specify if sources that are part of a group of publications that the user has signed up for may be "boosted" in the ranking when the user accesses restricted news content. Establishment of a relationship with the user may also include receiving a password from the user for future news content access by the user.

Server 120 may access external news content (e.g., servers 130 and 140), fetch news content and aggregate the fetched news content in locally stored copy (act 310). For example, server 120 may use a news crawler (e.g., web robot) whose access to documents hosted by restricted news source server(s) 140 may be granted selectively, by observing the IP address of server 120 or by using a password given by the external news source to the news crawler. In another alternative implementation, a secret Uniform Resource Locator (URL) may be given to the news crawler by a news source (e.g., server 140) to enable the news crawler to retrieve restricted news content. The external newspaper sites may include, for example, restricted news content hosted on the Washington Post website, the New York Times website, or other news content websites. The fetched restricted news content may be indexed and grouped, using conventional indexing and grouping algorithms, with unrestricted (i.e., "free") news content already stored at server 120 (act 315).

Figure 4:
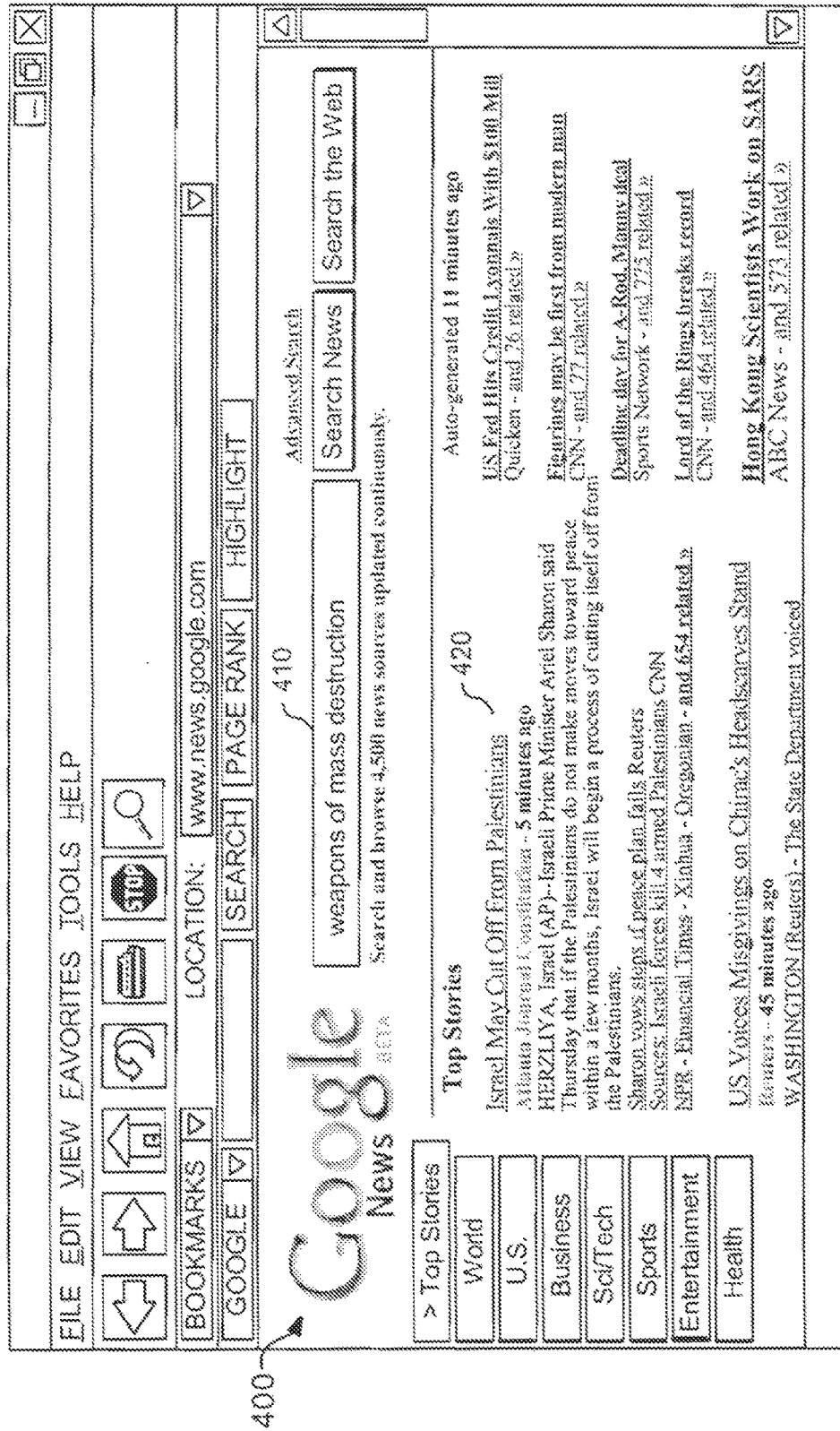
FIG. 4 is a diagram of an exemplary news aggregation search page according to an implementation consistent with the principles of the invention.
Figure 5:
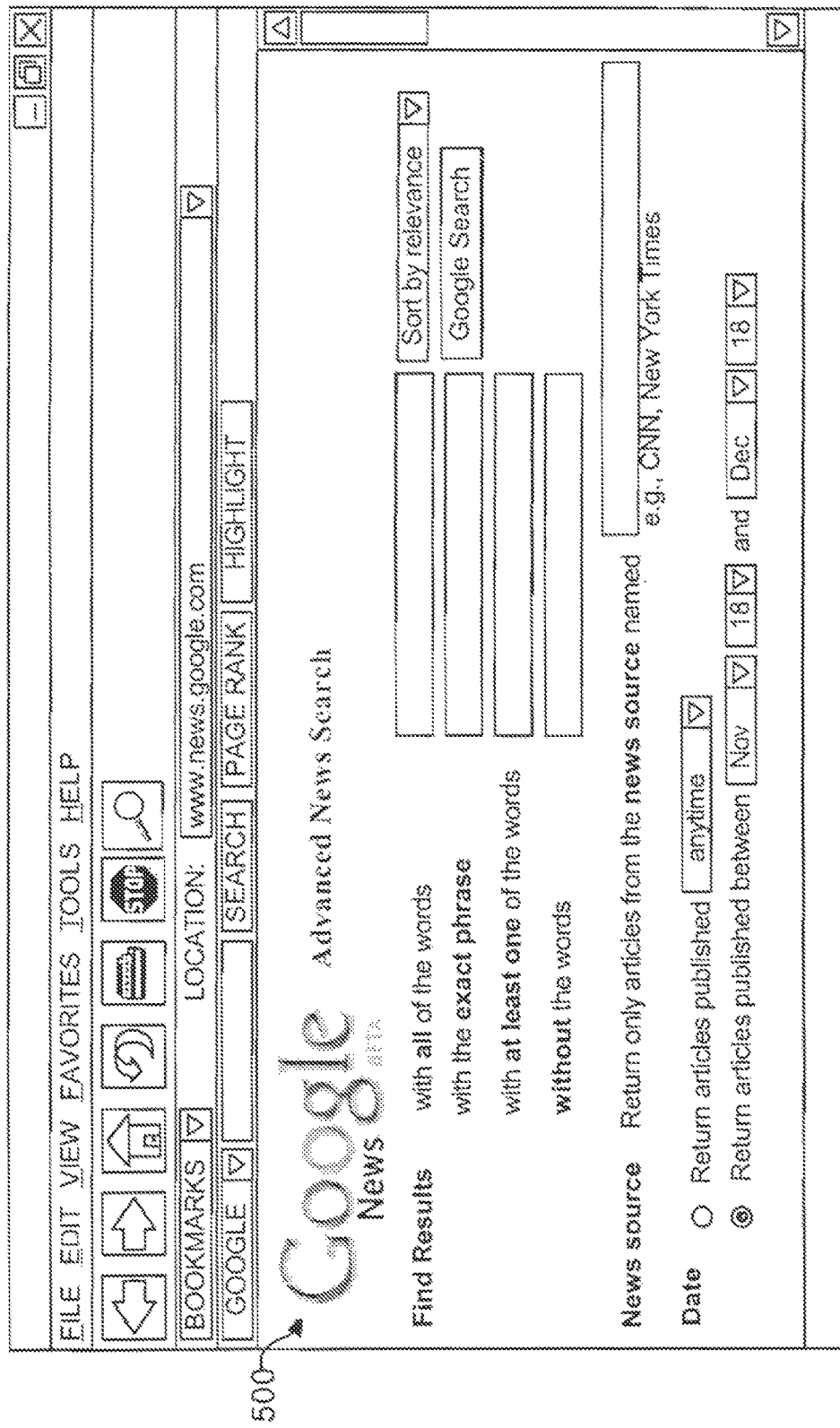
FIG. 5 is a diagram of an exemplary news aggregation advanced search page according to an implementation consistent with the principles of the invention.

Server 120 may determine whether a user has entered a news search query, or has browsed a section of unrestricted news content (act 320). For example, as shown in FIG. 4, a user may enter, in a search page 400 of a news aggregation service associated with server 120, search text in a search field 410. In another implementation, as shown in FIG. 5, a user may enter search text in a secondary "advanced news search" page 500 that may be readable from search page 400. Search page 500 may include various advanced search features that permit, for example, the user to search for news content based on publication date, exact phrases contained in the news content, etc. In a further implementation, for example, a user may select (e.g., "click" upon) a link to unrestricted news content, such as the link 420, shown in FIG. 4.

If a user has not entered a news search query, or has not browsed a section of unrestricted access news content, processing may return to act 310 above. If server 120 determines that a user has entered a news search query, or has browsed a section of unrestricted access news content, then server 120 may search locally stored copies of restricted news content to retrieve a ranked list of relevant stories, including links to relevant restricted news content (act 325) (FIG. 3B). Server 120 may, in one implementation, group and rank archival news content to recreate old newspapers on demand (e.g., recreate a specific newspaper on the day Kennedy was assassinated). Server 120 may then display links to the ranked list of relevant news stories (act 330). Links to restricted news content requiring payment may be intermingled with, or listed separately from unrestricted news content or some visual cue may be used to distinguish restricted news content from other news content.

Figure 6:
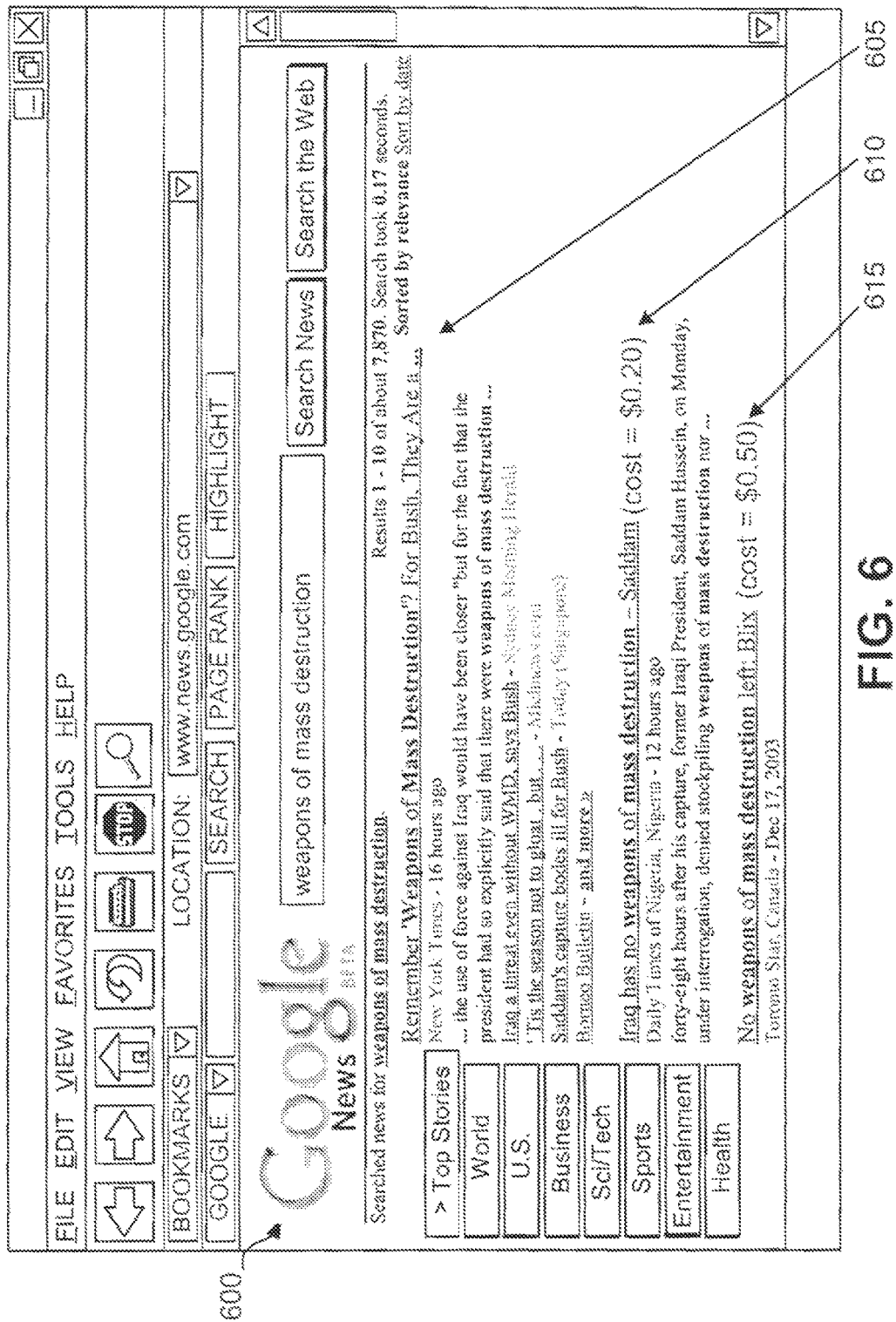
FIG. 6 is a diagram of an exemplary ranked list of news stories according to an implementation consistent with the principles of the invention.

FIG. 6 illustrates an exemplary page 600 that includes a ranked list of relevant news stories with links requiring payment being listed after an initial unrestricted news story. For example, page 600 may include a link 605 to unrestricted news content and links 610 and 615 to restricted news content. In some implementations, as shown in FIG. 6, each link to restricted news content may include an associated price for accessing the content of the individual link. The associated price may, in some implementations, be specified by the news source hosting the restricted news content. With respect to archived news content, the news source hosting the archived news content may, for example, stipulate a price of $0.10 for articles 1-3 months old, $0.25 for articles 3 months to 1 year old, etc. In another implementation, all archival news content associated with a certain event may be charged a flat fee (e.g., a flat fee charge of $50 may be charged to retrieve all news content associated with the Kennedy assassination from all archived news sources searched by server 120). In some implementations, the user may be able to specify how much he/she is willing to pay for accessing restricted news content (i.e., how much to access a given restricted news article). In another implementation, a price associated with any given article of restricted news content may be priced based on the articles perceived or estimated importance. Therefore, news articles with higher perceived or estimated importance may be designated with a higher price than less importance articles. In yet a further implementation, a price associated with any given article of restricted news content may be priced based upon the number of users accessing the article. For example, the price may increase or decrease based on a specified number of people accessing the article (e.g., price goes down after every x number of users access the article).

Figure 7:
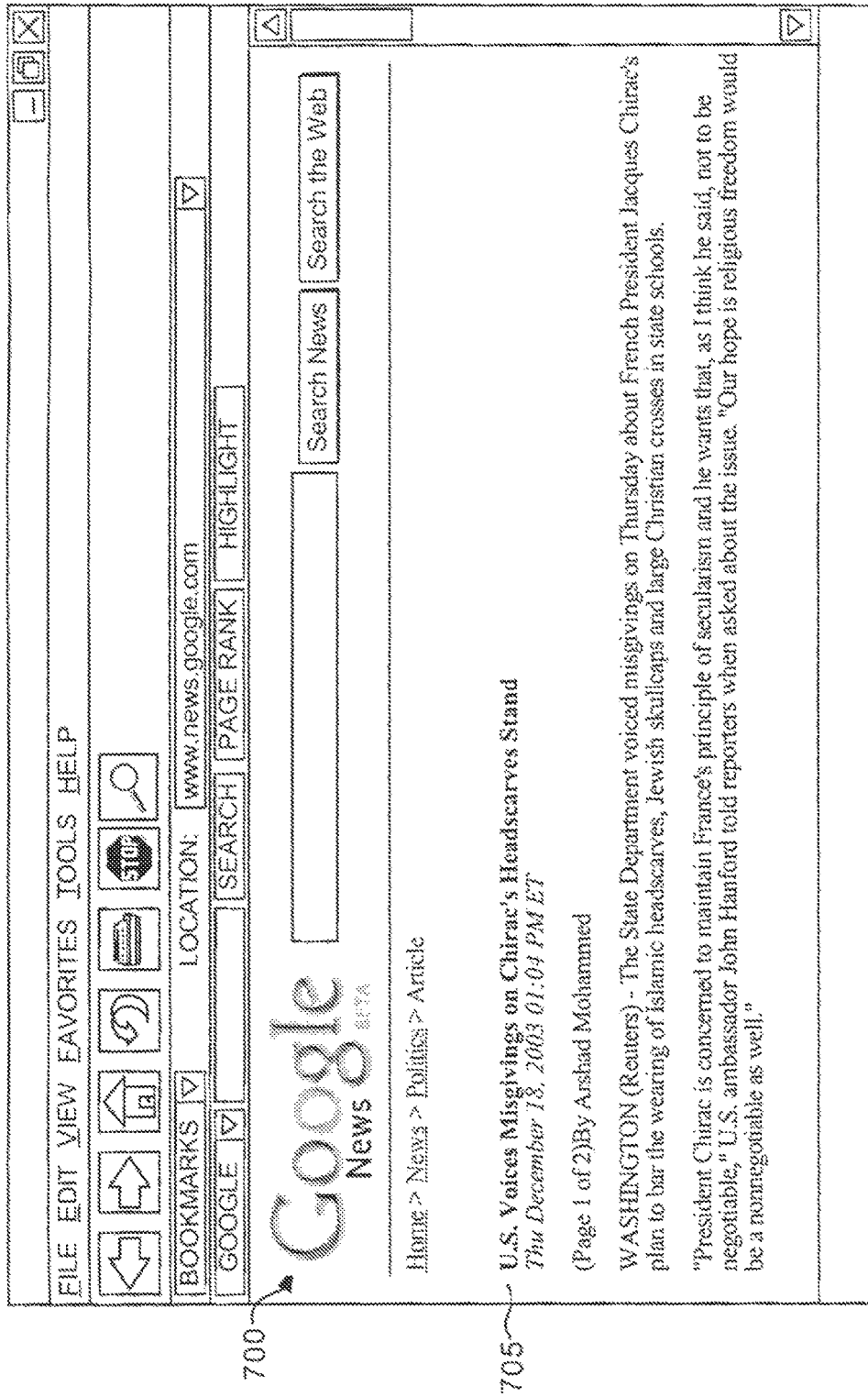
FIG. 7 is a diagram of a display of exemplary restricted access news content according to an implementation consistent with the principles of the invention.

After display of the links to the ranked list of relevant news stories, server 120 may determine whether a user has selected (e.g., "clicked" on) a link to restricted news content (act 335). If not, processing may return to act 310 above. If a user has selected a link to restricted news content, then server 120 may charge the user an appropriate fee and may provide access to the full content of the restricted news content (act 340) (FIG. 3C). In an alternative implementation, provision of access to the full content of the restricted news content may be based on registration information received from the user, or based on the user's identity (e.g., the user belongs to a "member" organization and is given access once identity information is verified). To provide access to the full content of the news content, server 120 may direct the user's browser to the appropriate document hosted on server 140. In another implementation, server 120 may retrieve a locally stored copy of the news content and send it for display by the user's web browser. FIG. 7 illustrates an exemplary page 700 that includes a display of the full content of restricted news story 705. The user may be charged the appropriate fee via, for example, payment information (e.g., credit card, debit card, etc.) obtained when establishing the billing relationship (see act 305). Alternatively, if a prior billing relationship has not been established with the user, the user may enter payment information at the time of provision of access to the restricted news content.

In one implementation consistent with principles of the invention, a certain number of selections of restricted news content may be free (e.g., 2 selections per week) and the remainder may be charged to the user. Archival news content may be charged to a user individually by article (e.g., $0.25 per article) or by story (e.g., all articles that are part of a story (a grouping of articles)).

In an alternative implementation consistent with the principles of the invention, server 120 may display an intermediate page that contains a small prefix of a sample of the restricted content of the link that the user has selected (act 345), along with a link to the full content of the restricted news content. This, thus, permits the user to preview some material of the news content prior to accessing, and paying for, access to the full content. Server 120 may determine whether the user selects the link to the full content of the restricted news content (act 350). If not, processing may return to act 310 above. If the user selects the link to the full content of the restricted news content, then server 120 may charge the user and provide access to the full restricted access news content (act 355). In an alternative implementation, provision of access to the full content of the restricted news content may be based on registration information received from the user, or based on the user's identity (e.g., the user belongs to a "member" organization and is given access once identity information is verified). To provide access to the full content of the news content, server 120 may direct the user's browser to the appropriate document hosted on server 140. In another implementation, server 120 may retrieve a locally stored copy of the news content and send it for display by the user's browser. The user may be charged the appropriate fee via, for example, payment information (e.g., credit card, debit card, etc.) obtained when establishing the billing relationship (see act 305). Alternatively, if a prior billing relationship has not been established with the user, the user may enter payment information at the time of provision of access to the restricted news content.

Subsequent to either of acts 340 and 355, server 120 may share revenue from accessed restricted news content with the entity(ies) (e.g., external newspaper sites) hosting the restricted news content (act 360). For example, if a user has accessed restricted news content from the New York Times web site through the news aggregation service of server 120, then revenue from this access, obtained via the previously established billing relationship, may be shared with the New York Times.

CONCLUSION

Systems and methods consistent with the principles of the invention may permit users to access restricted news content (e.g., news content that requires payment of a fee) via a news aggregation service that fetches and aggregates news content from news source websites across the Internet. Users using the news aggregation service may, thus, access restricted news content in addition to the non-restricted news content typically available via the news aggregation service.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3A, 3B and 3C, the order of the acts may be modified in other implementations consistent with the principles of the invention. Also, non-dependent acts may be performed in parallel. Also, while in the exemplary embodiments described, access to restricted news content may be based on monetary payment from a user, in alternative embodiments registration information or other consideration may be used to facilitate access to restricted news content.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

What is claimed is:

1. A computer-implemented method comprising:

aggregating, by a news aggregation server, restricted news content received from a plurality of news source servers that are remote from the news aggregation server, access to the restricted news content restricted to a set of users for a fee;

determining, by the news aggregation server, unrestricted news content that is freely available and browsed by a user;

responsive to determining the unrestricted news content that is freely available and browsed by the user, searching the aggregated restricted news content to retrieve a ranked group of restricted news content that is relevant to the unrestricted news content;

providing a link to selected restricted news content from the ranked group along with the fee required to access the selected restricted news content for display visually different from the unrestricted new content, wherein the fee required to access the selected restricted news content is determined based on importance of the selected restricted news content;

responsive to receiving a selection of the link to the selected restricted news content from the user, determining whether to allow the user to access the selected restricted news content based on verifying identification information of the user;

responsive to determining to allow the user to access the selected restricted news content based on verifying the identification information of the user, displaying a sample of the selected restricted news content for preview by the user prior to receiving the fee to access the selected restricted news content from the user; and responsive to receiving the fee from the user based on the preview of the sample, providing access, by the news aggregation server, to the selected restricted news content.

2. The computer-implemented method of claim 1, wherein providing access to the selected restricted news content comprises providing access to all or a portion of the selected restricted news content based on verifying the identification information of the user.

3. The computer-implemented method of claim 1, further comprising determining the fee required to access the selected restricted news content based on recency of the selected restricted news content.

4. The computer-implemented method of claim 1, further comprising determining the fee required to access the selected restricted news content based on a number of users having previously accessed the selected restricted news content.

5. The computer-implemented method of claim 1, further comprising:
determining whether an amount of the restricted news content provided to the user in a certain time period satisfies a threshold amount; and
wherein providing the access to the selected restricted news content is responsive to the threshold amount being satisfied.

6. The computer-implemented method of claim 1, further comprising adjusting a ranking of the selected restricted news content in the ranked group of restricted news content based on whether the selected restricted news content is from a news source server that the user has signed up.

7. The computer-implemented method of claim 1, further comprising receiving the restricted news content based on a secret uniform resource location (URL) given by a news source server.

8. The computer-implemented method of claim 1, wherein searching the aggregated restricted news content comprises grouping and ranking archival news content to recreate the restricted news content on demand.

9. The computer-implemented method of claim 1, wherein aggregating the restricted news content comprises indexing and grouping the restricted news content.

10. The computer-implemented method of claim 1, wherein determining whether to allow the user to access the selected restricted news content based on verifying the identification information of the user comprises determining whether the user is a member of an organization.

11. The computer-implemented method of claim 1, wherein a story of the ranked group of restricted news content comprises a group of news content on a same topic.

12. A system comprising:
one or more processors;
a memory storing instructions that, when executed, cause the system to:
aggregate restricted news content received from a plurality of news source servers that are remote from a news aggregation server, access to the restricted news content restricted to a set of users for a fee;
determine unrestricted news content that is freely available and browsed by a user;
responsive to determining the unrestricted news content that is freely available and browsed by the user, search the aggregated restricted news content to retrieve a ranked group of restricted news content that is relevant to the unrestricted news content;
provide a link to selected restricted news content from the ranked group along with the fee required to access the selected restricted news content for display visually different from the section of unrestricted new content, wherein the fee required to access the selected restricted news content is determined based on importance of the selected restricted news content;
responsive to receiving a selection of the link to the selected restricted news content from the user, determine whether to allow the user to access the selected restricted news content based on verifying identification information of the user;
responsive to determining to allow the user to access the selected restricted news content based on verifying the identification information of the user, display a sample of the selected restricted news content for preview by the user prior to receiving the fee to access the selected restricted news content from the user; and
responsive to receiving the fee from the user based on the preview of the sample, provide access to the selected restricted news content.

13. The system of claim 12 wherein to provide access to the selected restricted news content, instructions that, when executed, further cause the system to provide access to all or a portion of the selected restricted news content based on verifying the identification information of the user.

14. The system of claim 12 wherein instructions that, when executed, further cause the system to determine the fee required to access the selected restricted news content based on recency of the selected restricted news content.

15. The system of claim 12 wherein instructions that, when executed, further cause the system to determine whether an amount of the restricted news content provided to the user in a certain time period satisfies a threshold amount, and wherein providing the access to the selected restricted news content is responsive to the threshold amount being satisfied.

16. A computer program product comprising a non-transitory computer usable medium including a computer readable program, wherein the computer readable program when executed on a computer causes the computer to:
aggregate restricted news content received from a plurality of news source servers that are remote from a news aggregation server, access to the restricted news content restricted to a set of users for a fee;
determine unrestricted news content that is freely available and browsed by a user;
responsive to determining the unrestricted news content that is freely available and browsed by the user, search the aggregated restricted news content to retrieve a ranked group of restricted news content that is relevant to the unrestricted news content;
provide a link to selected restricted news content from the ranked group along with the fee required to access the selected restricted news content for display visually different from the section of unrestricted new content, wherein the fee required to access the selected restricted news content is determined based on importance of the selected restricted news content;
responsive to receiving a selection of the link to the selected restricted news content from the user, determine whether to allow the user to access the selected restricted news content based on verifying identification information of the user;
responsive to determining to allow the user to access the selected restricted news content based on verifying the identification information of the user, display a sample of the selected restricted news content for preview by the user prior to receiving the fee to access the selected restricted news content from the user; and responsive to receiving the fee from the user based on the preview of the sample, provide access to the selected restricted news content.

17. The computer program product of claim 16 wherein to provide access to the selected restricted content, the computer readable program when executed on the computer further causes the computer to provide access to all or a portion of the selected restricted news content based on verifying the identification information of the user.

18. The computer program product of claim 16 wherein the computer readable program when executed on the computer further causes the computer to determine the fee required to access the selected restricted news content based on recency of the selected restricted news content.

19. The computer program product of claim 16 wherein the computer readable program when executed on the computer further causes the computer to determine whether an amount of the restricted news content provided to the user in a certain time period satisfies a threshold amount, and wherein providing the access to the selected restricted news content is responsive to the threshold amount being satisfied.

* * * * *